United States Patent [19]

Mayer et al.

[11] 4,029,897

[45] June 14, 1977

[54] GLASS SEAL

[75] Inventors: Peter Mayer, Burlington; M. Krishna Murthy, Toronto; Albert H. Brooks, Agincourt; John A. Topping, Oakville, all of Canada

[73] Assignee: Quality Hermetics Limited, Toronto, Canada

[22] Filed: Aug. 7, 1975

[21] Appl. No.: 590,309

[52] U.S. Cl. .................. 174/152 GM; 106/53; 403/29; 403/30; 403/179; 428/433
[51] Int. Cl.² .............. C03C 27/02; C03C 3/10; H01B 17/30
[58] Field of Search ............ 174/50.58, 50.61, 151, 174/152 GM; 52/759; 65/59 R, 59 B; 106/53; 403/28, 29, 30, 179; 428/432, 433

[56] References Cited

UNITED STATES PATENTS

| 2,338,538 | 1/1944 | Pulfrich et al. | 403/30 |
|---|---|---|---|
| 3,256,136 | 6/1966 | Cole et al. | 106/53 X |
| 3,264,122 | 8/1966 | Earl | 106/53 X |
| 3,307,958 | 3/1967 | Earl | 106/53 X |
| 3,369,961 | 2/1968 | Dalton et al. | 106/53 X |
| 3,455,708 | 7/1969 | Earl | 106/53 |
| 3,613,050 | 10/1971 | Andrews | 174/152 GM X |

FOREIGN PATENTS OR APPLICATIONS

| 582,353 | 11/1946 | United Kingdom | 106/53 |
|---|---|---|---|
| 597,035 | 1/1948 | United Kingdom | 174/152 GM |
| 1,006,929 | 10/1965 | United Kingdom | 174/152 GM |

OTHER PUBLICATIONS

Scholes, S. R., *Modern Glass Practice*, Seventh Revised Edition, copyright date Aug. 1, 1975, published by Chaners Publishing Company, Inc., Boston, Mass. Chapter 4 entitled "The Glass-Making Oxides and the Structure of Glass" constituting pp. 24–41 relied on.

*Primary Examiner* — Laramie E. Askin
*Attorney, Agent, or Firm* — Sim & McBurney

[57] ABSTRACT

Hermetic glass seals of high electrical resistivity are provided. Glass compositions suitable for use in such seals and based on lead-silica glasses are described. Glass compositions having particular efficacy in a nuclear reactor environment also are described.

9 Claims, 1 Drawing Figure

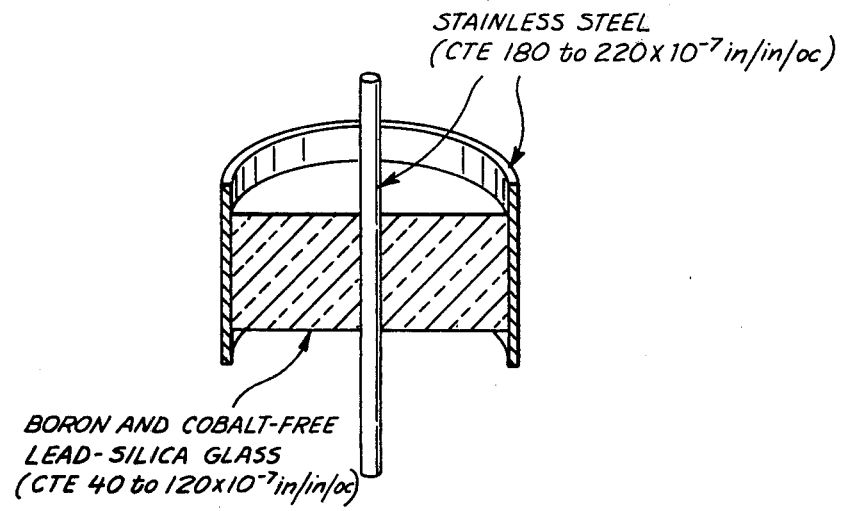

000
GLASS SEAL

FIELD OF INVENTION

This invention relates to glass seals, more particularly to electrical connectors containing hermetic glass seals.

BACKGROUND TO THE INVENTION

Glass seals are provided between electrically conductive elements in various electrical connectors. The seal usually is required to be hermetic and the glass often is required to have a high electrical resistance.

Electrical connectors using glass seals of this type may be employed where exposure to the effects of the operation of a nuclear reactor is anticipated. This particular use requires particularly stringent physical and chemical requirement of the glass and seal. Typical glass compositions for such use are described in U.S. Pat. Nos. 3,307,958 and 3,519,446.

SUMMARY OF THE INVENTION

The present invention provides a hermetic glass seal between electrically conductive components and particular seal structures.

BRIEF DESCRIPTION OF DRAWING

The sole FIGURE of the accompanying drawing is a sectional view of a seal construction provided in accordance with the present invention, illustrating inner and outer electrically-conductive stainless steel members and a boron- and cobalt-free lead-silica glass sealingly joining the stainless steel members.

DESCRIPTION OF PREFERRED EMBODIMENTS

Conventional electrical connector construction involves an inner metal conductor member, an outer metal conductor member and glass sealingly joining the members. The coefficient of thermal expansion of the components of this seal are such that the outer conductive member exceeds that of the glass and that of the glass exceeds that of the inner member.

While this construction is satisfactory in some environments, in others, where the temperature cycles periodically between low and high values, considerable thermal stresses occur, leading to cracking of the glass seal, to the detriment of the electrical resistivity and the hermeticity of the seal.

In accordance with one preferred embodiment of the invention, it has been found that these difficulties are overcome, if inner and outer metal members have coefficients of thermal expansion exceeding that of the glass. In a particularly preferred construction, the conductive metal is the same for the inner member and the outer member, typically stainless steel having a coefficient of thermal expansion of about 180 to about 220 × $10^{-7}$ in/in/° C.

Glasses suitable for use in constructions provided in accordance with this embodiment of the invention usually have a thermal expansion of about 40 to about 120 × $10^{-7}$ in/in/° C.

A hermetic seal between the metal members requires the use of a glass composition which has solubility for the oxides of the metals of the members. An oxide film is formed on the metal surface during heating to the temperature required for sealing.

The seal may be provided in a number of environments other than electrical connectors. The seal may be provided between inner and outer metal elements in various electrical packages, including thermocouples.

Various geometric arrangements may be used in this invention, including a single pin passing through a single circular seal connected to a circular outer metal member, a plurality of pins passing through individual circular seals connected to a single circular outer metal member, a plurality of pins or wires passing through a single seal connected to a single circular outer member and a plurality of pins or wires passing through individual circular seals connected to a single rectangular outer metal member.

Glasses for use in seals provided in nuclear environments should not contain boron oxide due to the changes which boron undergoes on neutron capture or cobalt oxide due to the induced radiation brought about by neutron capture. In accordance with the invention, there are provided hermetic glass seals formed from boron- and cobalt-free lead-silica glasses.

Glasses having varying compositions based on lead-silica glasses in accordance with this invention give satisfactory hermetic seals in prior art seal constructions and in seal constructions in accordance with the preferred embodiment of the invention. One such class of glasses contains alumina and varying quantities of group II metal oxides. Such group II metal oxides include zinc oxide, calcium oxide and barium oxide. Other non-alkali fluxing oxides, such as bismuth oxide, also may be present. Typical glass compositions according to this class contain lead oxide and silica in the relative quantities:

| | |
|---|---|
| PbO | about 45 to about 65 wt. % |
| SiO$_2$ | about 55 to about 35 wt. % | along with the following quantities of other components, the quantities being based on the total quantity of lead oxide and silica:

| | |
|---|---|
| Al$_2$O$_3$ | about 3 to about 4 wt. % |
| ZnO | about 7 to about 8 wt. % |
| CaO | 0 to about 6 wt. % |
| BaO | 0 to about 7 wt. % |
| Bi$_2$O$_3$ | 0 to about 7 wt. % |

These glass compositions provide satisfactory seals for use in many environments. However, it has been found that while these glass compositions exhibit high resistance at room and high temperatures and hence could be considered suitable for nuclear reactor environments, they are less preferred due to their high viscosity under normal sealing conditions.

Another class of glass compositions which is provided in accordance with this invention consists of a basic lead-silica glass containing varying quantities of lead oxide and silica. The range of quantities is as follows:

| | |
|---|---|
| PbO | about 55% to about 85 wt. % |
| SiO$_2$ | about 45% to about 15 wt. % |

Such glasses exhibit satisfactory low and high temperature resistivities for many uses and seals produced therefrom are hermetic. Seals produced from these glasses, however, exhibited a deteriorated hermeticity upon thermal cycling between high and low temperatures and hence may be unsuitable for use in such environments.

The following Table I reproduces data developed on seals formed using certain members of the lead oxide-silica glasses prior to thermal cycling. Each of the seals exhibited a resistance at room temperatures exceeding $10^9$ ohms and a resistance at 600° F of about $10^8$ ohms.

TABLE I

| Glass Composition wt. % | | $\alpha$ /° C | He Leak |
|---|---|---|---|
| PbO | SiO$_2$ | $\times 10^7$ | cc/sec. |
| 80 | 20 | 100.9 | $< 10^{-8}$ |
| 70 | 30 | 93.7 | $< 10^{-8}$ |
| 60 | 40 | 67.5 | $< 10^{-8}$ |

Differing quantities of various metal oxides may be added to such lead-silica glasses to improve their properties. Among the additive oxides which may be included, in various combinations and quantities, are Group II metal oxides including calcium oxide, magnesium oxide, barium oxide and zinc oxide, alumina, bismuth oxide, zirconium oxide, cerium oxide, germanium oxide and mixtures of soda and potassia.

One such composition contains varying quantities of germanium oxide, Group II metal oxides and fluxing oxides and contains lead oxide and silica in the relative quantities:

| PbO | about 65 to about 85 wt. % |
|---|---|
| SiO$_2$ | about 35 to about 15 wt. % | along with the following quantities of other components, the quantities being based on the total quantity of lead oxide and silica:

| GeO$_2$ | about 6 to about 18 wt. % |
|---|---|
| BaO | about 1 to about 9 wt. % |
| CeO$_2$ | about 2 to about 3 wt. % |
| CaO | 0 to about 2 wt. % |
| MgO | 0 to about 2 wt. % |
| ZnO | 0 to about 13 wt. % |
| Bi$_2$O$_3$ | 0 to about 8 wt. % |
| Al$_2$O$_3$ | 0 to about 5 wt. % |
| ZrO$_2$ | 0 to about 2 wt. % |

While these latter glasses have improved high temperature electrical resistivity and higher thermal expansion coefficients, the seals exhibit a decreased mechanical strength.

Standards have been established in certain jurisdictions for seals for use in nuclear environments. There are also other practical standards which the glass composition must meet to provide an effective seal for prolonged use. These standards include:

i. Glass must not contain boron or cobalt;
ii. Glass must be sealable at under 1100° C;
iii. Glass must have a coefficient of expansion of about 40 to about 120 $\times 10^{-7}$/° C;
iv. Seal must have an electrical resistance greater than $10^9$ ohms at 70° F and greater than $10^8$ ohms at 600° F;
v. Glass must have an electrical resistivity to provide the desired resistance of the seal, typically at least one order of magnitude greater than the resistance of the seal;
vi. Glass must have a gradually decreasing viscosity with increasing temperature to about $10^4$ poise at the sealing temperature;
vii. Seal must be hermetic, typically better than $10^{-8}$ ccs of Helium per second;
viii. Seal must retain its integrity after 20 thermal cycles of 70°–600°–70° F with stabilization at each temperature;
ix. Seal must withstand vibration;
x. Seal must maintain hermeticity in a slightly acidic atmosphere arising from the presence of ozone;
xi. Seal must maintain hermeticity in up to 95% relative humidity and possible contact with liquid water; and
xii. Seal must withstand a radiation dose of up to 100R/hr.

Glasses conforming to those stringent requirements have been formulated in accordance with a particularly preferred embodiment of the invention. One such class of lead-silica glass composition contains up to 5 mole % of mixed alkali, i.e. a mixture of sodium oxide and potassium oxide in similar quantities.

It is known that glasses containing alkali metal oxides such as sodium and potassium oxide have low electrical resistivity and hence normally would be expected to be avoided in seals requiring a very high resistance. It has been found, however, that the addition of limited quantities of a mixture of sodium oxide and potassium oxide in an approximate 1:1 weight ratio to a lead-silica glass does not decrease the resistance of the glass but does increase its coefficient of thermal expansion.

The addition of the mixed alkali may be made to the germanium-containing glass compositions described above to provide about 2 wt.% of both Na$_2$O and K$_2$O based on the total quantity of lead oxide and silica, in the glass composition.

Other lead-silica-based glasses containing the mixed alkali may be provided in accordance with this particularly preferred embodiment of the invention and also may contain additional components, such as minor quantities of Group II metal oxides, including calcium oxide, barium oxide, magnesium oxide and zinc oxide.

Typical glass compositions of this class contain lead oxide and silica in the relative quantities:

| PbO | about 63 to about 66 wt. % |
|---|---|
| SiO$_2$ | about 37 to about 34 wt. % | and the following components, based on the total weight of lead oxide and silica:

| Na$_2$O | about 1 to about 2 wt. % |
|---|---|
| K$_2$O | about 2 to about 3 wt. % |
| BaO | 0 to about 2 wt. % |
| MgO | 0 to about 1 wt. % |
| ZnO | 0 to about 3 wt. % |
| CaO | 0 to about 3 wt. % |

Members of the mixed alkali-added class of glasses along with their properties in a seal formed from stainless steel members are set forth in the following Table II:

TABLE II

| Glass Composition wt. % | | | | | | | | | | | | Resistance of Seal | |
|---|---|---|---|---|---|---|---|---|---|---|---|---|---|
| | | | | wt. % PbO + SiO₂ | | | | | | | α /° C | | 600° F × |
| PbO | SiO₂ | Na₂O | K₂O | BaO | MgO | ZnO | CaO | GeO₂ | Bi₂O₃ | CeO₂ | × 10⁷ | R.T. × 10¹⁰ | 10⁹ |
| 63.5 | 36.5 | 1.16 | 2.64 | — | — | — | — | — | — | — | 73.5 | 1.2 | 1.5 |
| 65.3 | 34.7 | 1.19 | 2.73 | — | — | — | 2.70 | — | — | — | 86.5 | 2.3 | 2.5 |
| 65.3 | 34.7 | 1.19 | 2.73 | — | 0.39 | 0.69 | 1.62 | — | — | — | 99.5 | 5.0 | 5.0 |
| 65.3 | 34.7 | 1.19 | 2.73 | 1.48 | 0.39 | — | 1.62 | — | — | — | 96.3 | 2.5 | 6.4 |
| 65.3 | 34.7 | 1.19 | 2.73 | — | 0.77 | — | 1.62 | — | — | — | — | 1.85 | — |
| 65.3 | 34.7 | 1.19 | 2.73 | — | 0.39 | 1.37 | 1.08 | — | — | — | — | 3.5 | 8.7 |
| 65.3 | 34.7 | 1.19 | 2.73 | — | 0.39 | 2.06 | 0.54 | — | — | — | 94.3 | 3.1 | 6.9 |
| 65.3 | 34.7 | 1.19 | 2.73 | — | 0.39 | 2.75 | — | — | — | — | 99.9 | 5.4 | 7.7 |
| 73.9 | 26.1 | 1.96 | 1.96 | 6.52 | — | — | — | 13.05 | 6.52 | 2.61 | 97.8 | 10.5 | 2.25 |

It will be seen from this Table II that each of the glass compositions has a thermal expansion and the seals have electrical resistance values well within the required ranges. In all cases, the seals were hermetic and in most cases the seals withstood thermal cycling.

Another class of glass composition provided in accordance with this particularly preferred embodiment of the invention uses varying quantities of Group II metal oxides, in particular barium oxide, in a lead-silica glass composition to provide superior electrical resistivity, compression strength and thermal expansion coefficient properties. Compositions in accordance with this class include lead oxide and silica in the following relative quantities:

| | |
|---|---|
| PbO | about 60 to about 80 wt. % |
| SiO₂ | about 40 to about 20 wt. % | and the following additional components, in quantities based on the total weight of lead oxide and silica:

| | |
|---|---|
| BaO | about 2 to about 14 wt. % |
| MgO | 0 to about 2 wt. % |
| ZnO | 0 to about 3 wt. % |
| CaO | 0 to about 3 wt. % |

Glasses formulated in this way exhibit excellent sealing characteristics with the electrical resistance of the seals exceeding substantially the requirements set forth above. Members of this class of glasses along with their properties in a seal formed from stainless steel members are set forth in the following Table III:

TABLE III

| Glass Composition | | | | | | |
|---|---|---|---|---|---|---|
| wt. % | | wt. % based on PbO + SiO₂ | | | | α /° C |
| PbO | SiO₂ | BaO | MgO | ZnO | CaO | × 10⁷ |
| 79.0 | 21.0 | 2.14 | — | — | — | 95.0 |
| 79.0 | 21.0 | 10.70 | — | — | — | 104.6 |
| 71.5 | 28.5 | 2.42 | — | — | — | 87.7 |
| 71.5 | 28.5 | 12.12 | — | — | — | 79.9 |
| 61.8 | 38.2 | 2.79 | — | — | — | 56.2 |
| 6.18 | 38.2 | 13.96 | — | — | — | 81.3 |
| 61.8 | 38.2 | 13.96 | 0.73 | — | — | 58.0 |
| 61.8 | 38.2 | 13.96 | 1.97 | — | — | 68.1 |
| 61.8 | 38.2 | 13.96 | — | 1.3 | — | 66.9 |
| 61.8 | 38.2 | 13.96 | — | 2.6 | — | 60.9 |
| 61.8 | 38.2 | 13.96 | — | — | 1.02 | 70.3 |
| 61.8 | 38.2 | 13.96 | — | — | 2.04 | — |

Each of the seals exhibited a resistance greater than 10⁹ ohms at room temperature and greater than 10⁸ ohms at 600° F and was hermetic after thermal cycling 20 times from 70° to 600° F.

The seals and electrical connectors of the present invention may be formed by conventional sealing techniques or modifications thereof, typically at sealing temperatures of about 700° to about 1100° C.

Typically, the seals may be made by forming the glass, powdering the glass, mixing the powder with a suitable binder, pressing the mixture to the shape required, sintering seal preforms to a desired strength, assembling the connector from its component parts and sealing the connector by heating for about 5 to about 15 minutes at about 700° to about 1100° C.

What we claim is:

1. A seal construction comprising an inner electrically-conductive member, an outer electrically-conductive member and a glass sealingly joining said electrically-conductive members, said glass being formed from a boron- and cobalt-free lead-silica glass containing the following relative proportions of lead oxide and silica:

| | |
|---|---|
| PbO | about 45 to about 65 wt. % |
| SiO₂ | about 55 to about 35 wt. % | and the following other components in quantities based on the total weight of lead oxide and silica:

| | |
|---|---|
| Al₂O₃ | about 3 to about 4 wt. % |
| ZnO | about 7 to about 8 wt. % |
| CaO | 0 to about 6 wt. % |
| BaO | 0 to about 7 wt. % |
| Bi₂O₃ | 0 to about 7 wt. %. |

2. A seal construction comprising an inner electrically-conductive member, an outer electrically-conductive member and a glass sealingly joining said electrically-conductive members, said glass being formed from a boron- and cobalt-free lead oxide-silica glass consisting of lead oxide and silica in the following relative proportions:

| | |
|---|---|
| PbO | about 55 to about 85 wt. % |
| SiO₂ | about 45 to about 15 wt. % |

3. A seal construction comprising an inner electrically-conductive member, an outer electrically-conductive member and a glass sealingly joining said electrically-conductive members, said glass being formed from a boron- and cobalt-free lead-silica glass having the following relative proportions of lead oxide and silica:

| | |
|---|---|
| PbO | about 65 to about 85 wt. % |
| SiO₂ | about 35 to about 15 wt. % | and the following additional components in quantities based on the total weight of lead oxide and silica:

| | |
|---|---|
| GeO$_2$ | about 6 to about 18 wt. % |
| Bi$_2$O$_3$ | 0 to about 8 wt. % |
| BaO | about 1 to about 9 wt. % |
| CaO | 0 to about 2 wt. % |
| MgO | 0 to about 2 wt. % |
| ZnO | 0 to about 13 wt. % |
| CeO$_2$ | about 2 to about 3 wt. % |
| Al$_2$O$_3$ | 0 to about 5 wt. % |
| ZrO$_2$ | 0 to about 2 wt. % |
| Na$_2$O | 0 to about 2 wt. % |
| K$_2$O | 0 to about 2 wt. % |

4. A seal construction comprising an inner electrically-conductive member, an outer electrically-conductive member and a glass sealingly joining said electrically-conductive members, said glass being formed from a boron- and cobalt-free lead-silica glass having the following weight proportions of lead oxide and silica:

| | |
|---|---|
| PbO | about 63 to about 66 wt. % |
| SiO$_2$ | about 37 to about 34 wt. % | and the following components in quantities based on the total quantity of lead oxide and silica:

| | |
|---|---|
| Na$_2$O | about 1 to about 2 wt. % |
| K$_2$O | about 2 to about 3 wt. % |
| BaO | 0 to about 2 wt. % |
| MgO | 0 to about 1 wt. % |
| ZnO | 0 to about 3 wt. % |
| CaO | 0 to about 3 wt. % |

5. The seal construction of claim 4, wherein said electrically-conductive members each has a coefficient of thermal expansion exceeding that of the glass.

6. The seal construction of claim 5 wherein each of the electrically-conductive members is stainless steel having a coefficient of thermal expansion of about 180 to about 220 × 10$^{-7}$ in/in/° C.

7. A seal construction comprising an inner electrically-conductive member, an outer electrically-conductive member and a glass sealingly joining said electrically-conductive members, said glass being formed from a boron- and cobalt-free lead silica glass having the following relative proportions of lead oxide and silica:

| | |
|---|---|
| PbO | about 60 to about 80 wt. % |
| SiO$_2$ | about 40 to about 20 wt. % | and the following additional components in quantities based on the total weight of lead oxide and silica:

| | |
|---|---|
| BaO | about 2 to about 14 wt. % |
| MgO | 0 to about 2 wt. % |
| ZnO | 0 to about 3 wt. % |
| CaO | 0 to about 3 wt. % |

8. The seal construction of claim 7, wherein said electrically-conductive members each has a coefficient of thermal expansion exceeding that of the glass.

9. The seal construction of claim 8, wherein each of the electrically-conductive members is stainless steel having a coefficient of thermal expansion of about 180 to about 220 × 10$^{-7}$ in./in./° C.

* * * * *